US008108670B2

(12) United States Patent
Morgan et al.

(10) Patent No.: US 8,108,670 B2
(45) Date of Patent: Jan. 31, 2012

(54) CLIENT APPARATUS AND METHOD WITH KEY MANAGER

(75) Inventors: Dennis Morgan, Pine Grove, CA (US); Alan D. Ross, Shingle Springs, CA (US)

(73) Assignee: Intel Corporation, Santa Clara, CA (US)

(*) Notice: Subject to any disclaimer, the term of this patent is extended or adjusted under 35 U.S.C. 154(b) by 1361 days.

(21) Appl. No.: 11/457,366

(22) Filed: Jul. 13, 2006

(65) Prior Publication Data

US 2008/0016337 A1 Jan. 17, 2008

(51) Int. Cl.
*H04L 29/06* (2006.01)
(52) U.S. Cl. .......................................... 713/158; 726/10
(58) Field of Classification Search .................. 726/2–5, 726/10; 713/150, 155, 156, 158
See application file for complete search history.

(56) References Cited

U.S. PATENT DOCUMENTS

| 5,774,552 A | 6/1998 | Grimmer |
| 6,111,864 A | 8/2000 | Kabasawa |
| 6,223,291 B1 * | 4/2001 | Puhl et al. ........................ 726/28 |
| 6,895,501 B1 | 5/2005 | Salowey |
| 6,986,052 B1 | 1/2006 | Mittal |
| 7,013,484 B1 | 3/2006 | Ellison et al. |
| 7,050,589 B2 | 5/2006 | Kwan |
| 7,490,248 B1 * | 2/2009 | Valfridsson et al. .......... 713/193 |
| 2003/0110376 A1 * | 6/2003 | Wiener et al. ................. 713/158 |
| 2003/0196080 A1 * | 10/2003 | Karman ........................ 713/150 |
| 2007/0018992 A1 * | 1/2007 | Wong ............................ 345/545 |

* cited by examiner

*Primary Examiner* — Kim Vu
*Assistant Examiner* — John B King
(74) *Attorney, Agent, or Firm* — Schwabe, Williamson & Wyatt, P.C.

(57) ABSTRACT

In some embodiments, an apparatus comprises a certificate store to store a current certificate associated with a key pair including a current public key and a current private key; a policy decision point (PDP) module to monitor the certificate store and to ascertain whether the current certificate has expired or is expiring; and a key manager, based at least in part on the PDP module determining that the current certificate has expired or is expiring, being adapted to identify encrypted information encrypted with an encrypting key of the key pair and to decrypt the encrypted information with a decrypting key of the key pair to obtain unencrypted information.

16 Claims, 6 Drawing Sheets

CLIENT APPARATUS AND METHOD WITH KEY MANAGER

BACKGROUND

1. Technical Field

Embodiments of the present invention are related to the field of electronic devices, and in particular, to electronic devices using public key cryptography.

2. Description of Related Art

As digital certificates and public key infrastructures become more prevalent, there is a need for a higher quality certificate and content management functionality to protect the integrity, confidentiality and availability of data. Encryption keys expire and a user/organization may be forced to keep the expired encryption keys on their system for extended periods of time to decrypt the data that was encrypted with them. Additionally, the longer the keys must be maintained, the more likely they will be lost. For example, where such expired keys are maintained on a client (e.g., laptop, desktop computer), the expired key may be lost when upgrading the client, which in turn may cause the data encrypted by the expired key to be lost.

DETAILED DESCRIPTION OF ILLUSTRATIVE EMBODIMENTS

Figure 1:
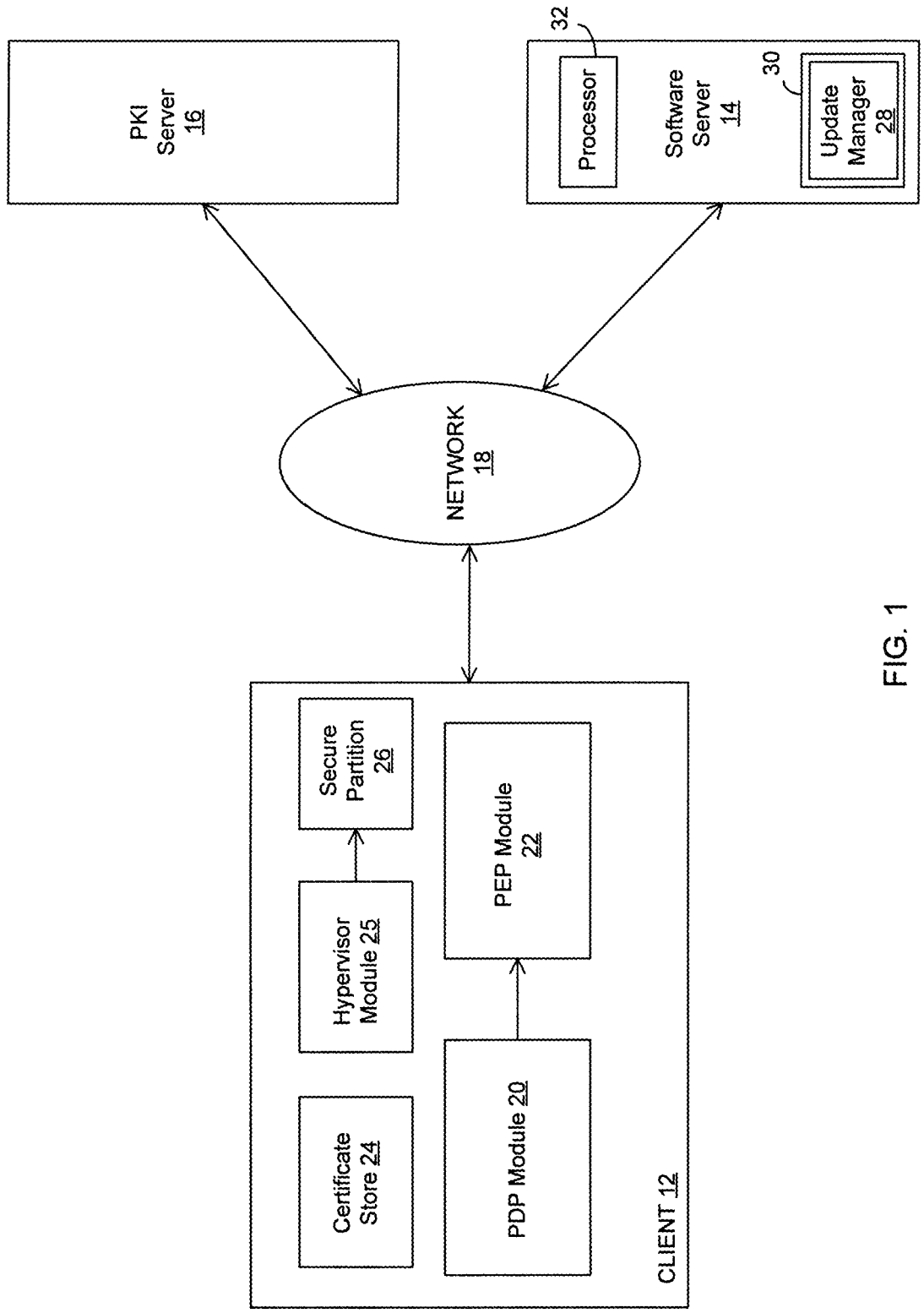
FIG. 1 is a block diagram of a security management system, according to some embodiments of the present invention.

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention. The term "coupled" shall encompass a direct connection, an indirect connection or an indirect communication.

In the following description, terminology is used to discuss certain features of various embodiments of the present invention. For example, a "platform" includes hardware and/or software that process information. Examples of a platform include, but are not limited or restricted to any of the following: a computer (e.g., a desktop computer, a laptop, a hand-held device, a server, a workstation, etc.); data transmission equipment (e.g., a router, a network hub, a network bridge, a switch, a gateway, a facsimile machine, etc.), wireless equipment (e.g., a cellular base station, a telephone handset, etc.); or a television set-top box. "Software" includes code that, when executed, performs a certain function. "Information" is defined as one or more bits of data, address, and/or control. A "link" is defined as one or more information-carrying mediums (e.g., electrical wire, optical fiber, cable, bus, or wireless signaling technology).

"Policy-based network management" (PBNM) is an approach to network management that attempts to provide a high level interface to network management. PBNM hides the low-level mechanisms of network management behind a high level abstraction called policies, including security policies. Policies are human-readable, simple to express propositions that dictate what actions and behaviors are permitted on a computer network. A PBNM protocol may include a "policy decision point" (PDP) which interprets policies to determine whether a request for network service should be made and a "policy enforcement point" (PEP) to make the request for the network service. In some cases, the PDP and PEP may be located in the same device.

A "cryptographic operation" is an operation performed for additional security on information. These operations may include encryption, decryption, hash computations, and the like. In certain cases, the cryptographic operation uses a key, which is a series of bits. For asymmetric key cryptography ("public key cryptography"), a device/client is associated with unique "key pair" or "public-private key pair" that includes a "public key" and a "private key". In general, data encrypted with the public key may be decrypted only with the associated private key of the key pair and data encrypted by the private key may only be decrypted by the associated public key.

A "digital certificate" or "certificate" issued by a trusted entity, such as a "certification authority" (CA), is an electronic document which binds a particular public key to the client identified by the certificate, and only that public key will function with the corresponding private key possessed by the client. Hence, each certificate may be defined as being "associated with a key pair" of the public key and its corresponding private key.

A "digital signature" includes digital information signed with a private key (signing key) of its signatory to vouch for the origins of the certificate. The digital signature also may ensure that the digital information has not been illicitly modified after being digitally signed. The digital information may be provided as a hash value produced by a one-way hash operation. A "hash operation" is a one-way conversion of information to a fixed-length representation referred to as a "hash value".

"Public key infrastructure" (PKI) provides the basis for managing various public keys that are used to provide network security through encryption and digital signatures. PKI provides a security architecture using digital certificates, public key cryptography, and CAs. PKI and digital certificates may be governed by standards. An example for digital certificates is provided in International Telecommunications Union—Telecommunication Standardization Sector (ITU-T) "X.509", Information Technology—Open Systems Interconnection—The Directory: Public Key and Attribute Certificate Frameworks, March 2000. The X.509 defines an authentication framework which is part of the ITU-T 500 standard.

With public key cryptography, a message transmitted to a "client" may be first encrypted by a sender using the client's public key and sent across the insecure communications channel by a sender. The message then may be decrypted by the client using its private key. The client's public key may be published in a public key file or imbedded, for example, in a digital certificate in a directory of a trusted entity (e.g., CA), while the private key may be kept secret by the client. Prior to sending the encrypted message to the client, the sender may obtain a digital certificate for the client from the CA. Prior to transmitting the digital certificate to the sender, the CA may encrypt it using the private key of the CA and incorporate the CA's digital signature into the certificate. The public key of the CA may be widely published; hence, upon receiving the digital certificate, the sender may use it to verify the CA prior to using the public key contained in the certificate to send the encrypted message to the client.

The CA may use a "certificate manager" to sign and revoke certificates. The certificate manager also may maintain a database of issued certificates so that it can track renewal, expiration, and revocation of certificates. The CA also may have a "registration manager" (the registration manager may also be separate from the CA) to which the certificate manager delegates some certificate management functions. In particular, a registration manager performs tasks such as end-entity authentication and formulation of the certificate requests for the certificate manager. In this configuration, end-entities (e.g., clients) register with the registration managers to obtain certificates. For example, the client may send a certificate signing request (CSR) to a registration manager to ask the CA to issue a certificate. The registration manager may authenticate the client for the certificate manager and requests a new or renewed certificate for the client from the certificate manager.

The conditions for "validity" of a certificate may be set by the CA. Along with the public key of the client and CA digital signature, the digital certificate may include an expiration date. Generally, a certificate is invalid only for a given set of circumstances. As an example, a previously valid X.509 certificate may only be considered invalid as a result of a change in either of two factors: expiration of a certificate validity period or certificate revocation.

Within this X.509 standard, different types of X.509 version 3 certificates are defined using a Key Usage Identifier, such as signature, authentication, and encryption certificates. The Key Usage Identifier is a key usage extension which defines the purpose (e.g., encryption or encipherment, signature, certificate signing) of the public key contained in the certificate. The usage restriction may be employed when a key that could be used for more than one operation is to be restricted; hence, encryption certificates may be used for key encryption, data encryption or just decryption, depending upon the Key Use Identifier. "Encryption certificate" is defined to mean any digital certificate including a public key which is used for the purpose of decrypting information, whether such information is data, keys or any other digital information stored in the client. "Non-encryption certificate" is defined to mean certificates where key use is restricted to not include encryption, such certificates including, but not limited to, signature and authentication certificates. Encryption and Non-encryption certificates may include, but are not limited to X.509 certificates, which merely provide examples of such certificates.

With reference to FIG. 1, there is illustrated a security management system 10, in accordance with some embodiments of the present invention, which may be characterized as a policy-based network management (PBNM) system. The system 10 includes one or more security-enabled, client computing devices 12 ("clients 12" or "client devices 12"), although only one client 12 is illustrated in FIG. 1. In some embodiments, the client 12 may be a platform, as defined above. In some embodiments, the client 12 may be in communications with a software server 14 and a public key infrastructure (PKI) server 16 through one or more links of a network 18. The client 12 may include a policy decision point (PDP) module 20, a policy enforcement point (PEP) module 22 in communication with the PDP module 20, a certificate store 24 for storing one or more digital certificates with expiration dates. The digital certificates may include encryption certificates, along with other certificates, such as authentication and signature certificates. In some embodiments, the client 12 may include a hypervisor module 25 capable of generating or instantiating a secure memory partition ("secure partition") 26. The client 12 includes the appropriate processor, software and memory/storage resources to support these components, with one illustrative example of such processor, software and memory/storage resources being provided in FIG. 5, to be discussed hereinafter.

In some embodiments, the software server 14 may be what is referred to as a "high integrity" software server, in that the software resident therein is validated and certified. The software server 14 may contain software, including at least a key manager (Key MGR) 28, which may be downloaded to the client 12. The software may be moved from a protected mass storage (not shown) to a protected memory by a processor 32 for downloading to the client 12. The network 18 may be hardwired, wireless, or a combination of hardwired and wireless, may be a local or wide area computer network, and may be, for example, the Internet. The network 18 may be one network or multiple networks separately connecting to the servers 14 and 16.

In general, the security management system 10, in accordance with some embodiments of the present invention, may provide the ability to, in a hands off and secure manner, to identify encrypted information (encrypted data and files) that is resident in the client 12 and encrypted with the current key that has expired or is about to expire, and to decrypt the encrypted information with the current (old) key to obtain unencrypted information and to re-encrypt the unencrypted information with a new key. More specifically, the PDP module 20 may monitor the certificate store 24 to determine if any of the one or more current certificates have expired or are about to expire. If the PDP module 20 determines that a current certificate has expired or is about to expire, then the PDP module 20 may send an instruction to the PEP module 22, which in turn requests that the key manager 28 software resident in the software server 14 be downloaded in a secure session to the secure memory partition 26 of the client 12.

The downloaded key manager 28 may include a number of functions, such as requesting, receiving, and installing a new certificate obtained from the PKI server 16. In the case of an encryption certificate having expired or about to expire, the downloaded key manager 28 may locate the encrypted information on the client 12, move the encrypted information into to the secure partition 26, decrypt the encrypted information in the secure partition 26 to obtain unencrypted information, and re-encrypt the unencrypted information with a new key. In some embodiments, the new key may generated at the client 12 or elsewhere at a central system, such as the PKI server 16. In some embodiments, the located encrypted information may have been encrypted with the current public key or the current private key of a key-pair.

The certificate store 24 may be a personal certificate store for certificates containing the client's current public key. In some embodiments, the certificate store 24 may keep a link which indicates the location of a current private key associated with the certificate. In other words, the current and private keys are part of the same current key pair (public-private key pair). In some embodiments, the private key is placed in a secure system registry, possibly encrypted with a password. In some embodiments, the private key for the digital certificate may be stored on a machine-readable card (not shown) held by the user, and the link stored with the certificate in the certificate store 24 may point to a card reader for the card with the private key. Other arrangements for storing and accessing the private key may be used.

Figure 2:
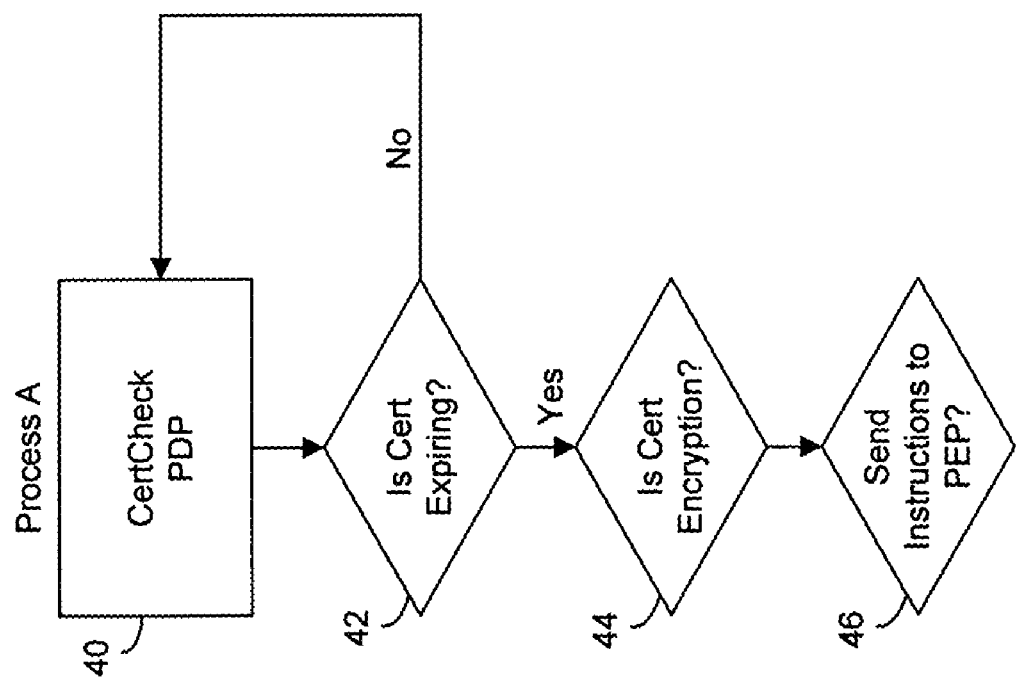
FIG. 2 is a flow chart of a process A undertaken by the security management system of FIG. 1, according to some embodiments of the present invention.
Figure 3A:
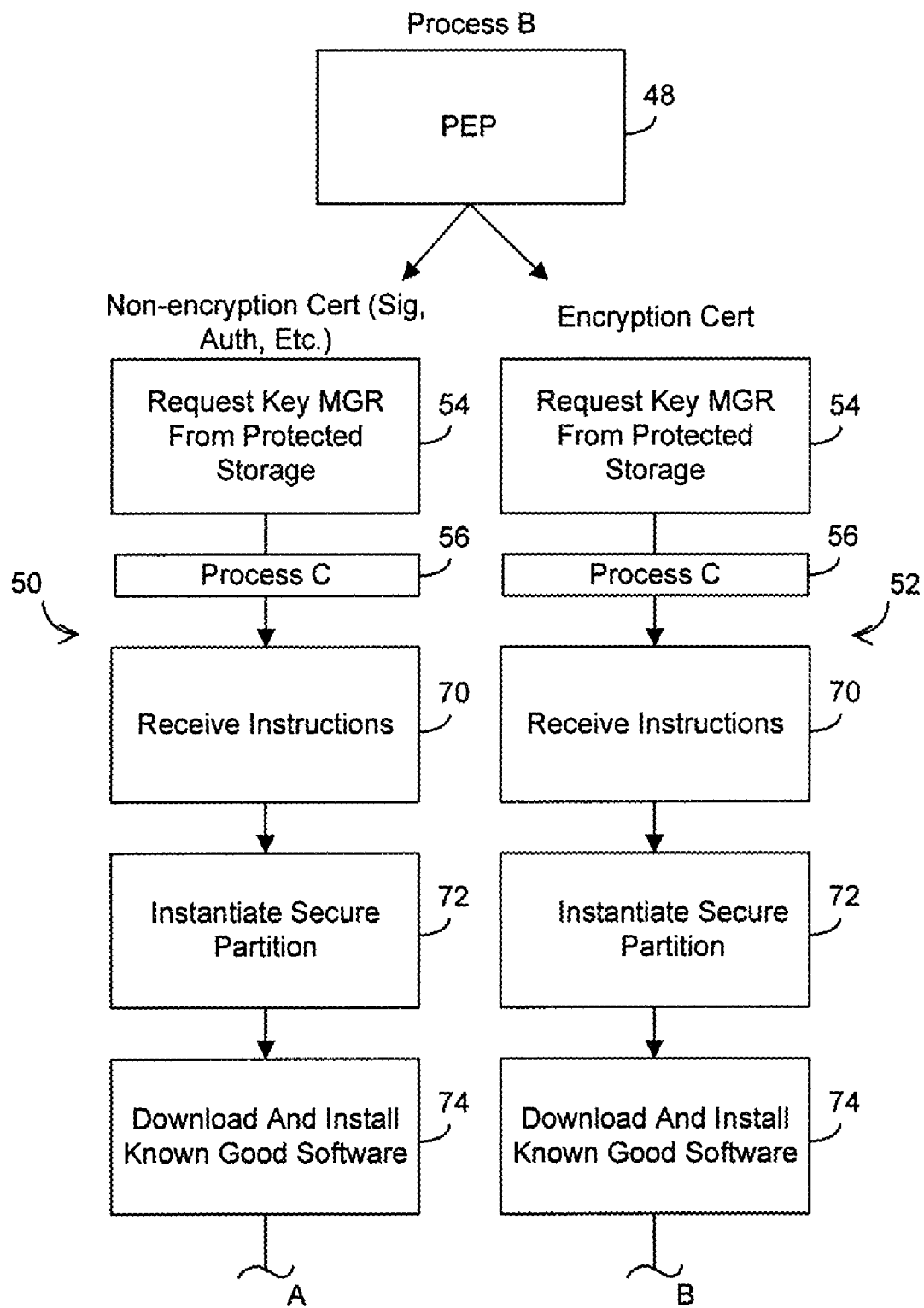
FIG. 3 (divided over FIGS. 3A and 3B) is a flow chart of a process B undertaken by the security management system of FIG. 1, according to some embodiments of the present invention.
Figure 3B:
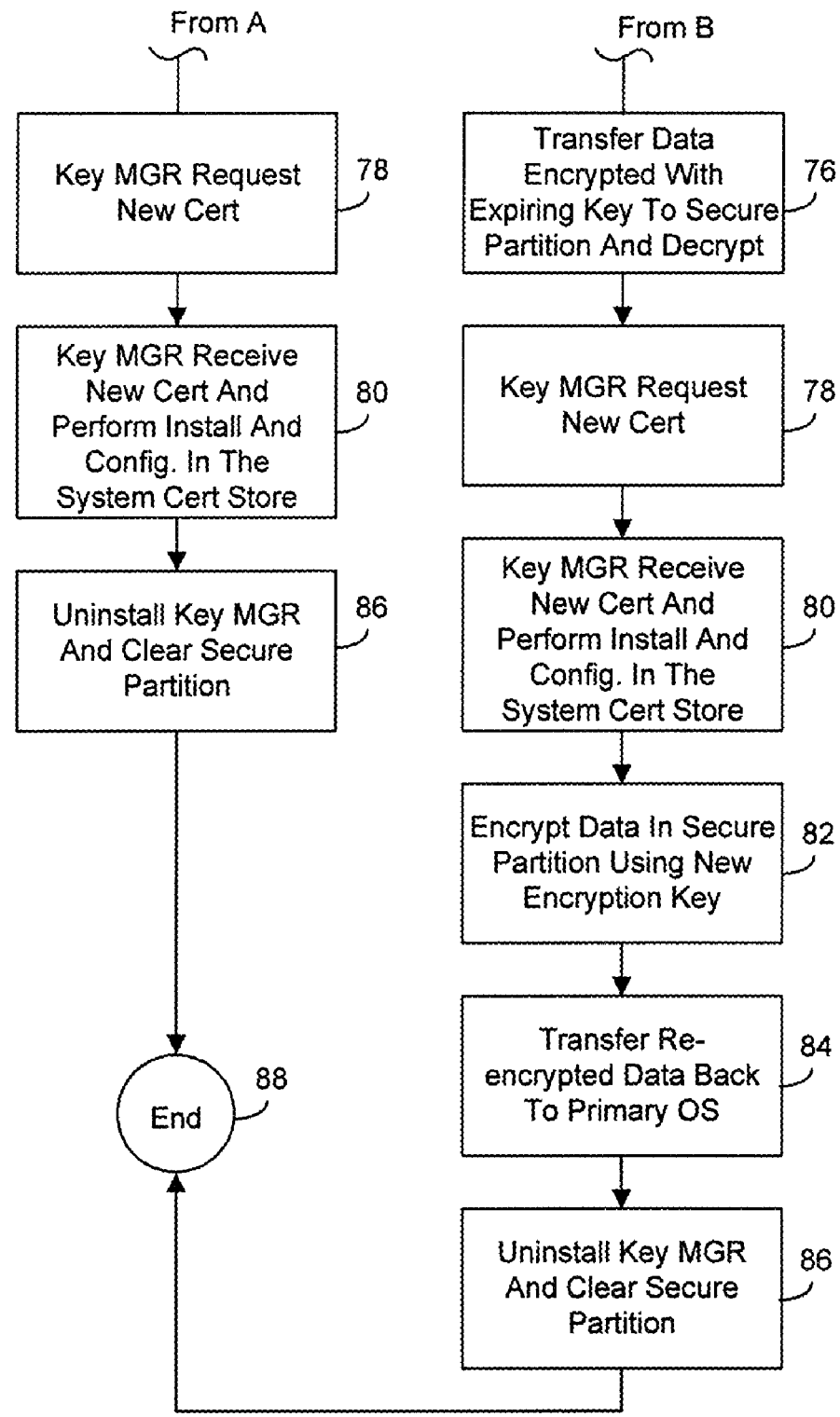
Figure 4:
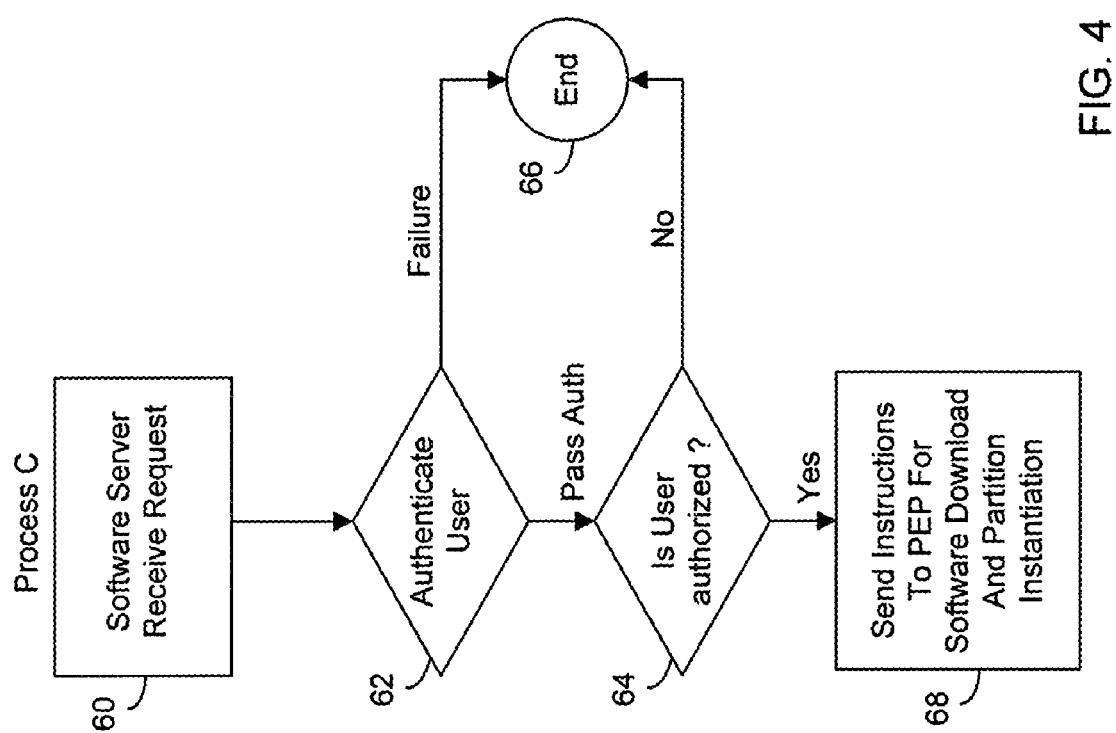
FIG. 4 is a flow chart of a process C undertaken by the security management system of FIG. 1, according to some embodiments of the present invention.

With reference to FIGS. 1-4, operation of the security management system 10, according to some embodiments of the invention, is described with FIGS. 2, 3, and 4 showing Processes A, B, and C, respectively. Referring to FIGS. 1 and 2, the Process A is undertaken by the PDP module 20. In an operation 40 of FIG. 3, the PDP module 20 may initiate a certificate check (CertCheck) routine. In some embodiments, this CertCheck routine may include the PDP module 20 monitoring the local certificate store 24 to identify digital certificates in the certificate store 24 that have expired or are about to expire. Each certificate may have an expiration date, defining the end of the validity period for that certificate. In some embodiments, for some predetermined period before the expiration date (for example, two weeks), the certificate may be considered to be "about to expire".

In an operation 42, if it is determined that the certificate has expired or is about to expire, then the Process A proceeds to operation 44; otherwise, Process A loops back to continued monitoring the certificates in the operation 40. In an operation 44, the PDP module 20 may identify whether or not it is an encryption certificate, as previously defined. If the certificate is not an encryption certificate, then the certificate may be a signature or authentication certificate or other non-encryption type certificate. Regardless of the type of certificate determined in operation 44, in an operation 46, the Process A proceeds with sending an instruction to the PEP module 22 to initiate the Process B shown in FIG. 3. This instruction allows the PDP module 20 to direct the PEP module 22 to take various actions in the Process B, as will be discussed with respect to FIG. 3.

With respect to FIGS. 1 and 3, at an operation 48 of FIG. 3, the Process B is initiated, the PEP module 22 may follow one of two branches 50 and 52, depending upon whether the digital certificate was determined to be an encryption certificate or a non-encryption certificate (e.g., authentication/signature certificate) in operation 44 of the Process A of FIG. 3. Operations having the same function in the two branches 50 and 54 will be given the same reference number and will be described together.

With respect to both branches 50 and 52, in an operation 54 of FIG. 3, the PEP module 22 may communicate with the software server 14. More specifically, after authentication of the server 14 by the PEP module 22, the PEP module 22 in the operation 54 may communicate a request to the software server 14 to download from the protected memory 30 of the software server 14 to the client 12 the appropriate software, including at least the key manager 28 software. In some embodiments, other certified software, in addition to the key manager 28 software, may be requested. For example, when word processing documents stored in the client 12 have been encrypted, the PEP module 22 also may request that a protected version (validated and certified) of the appropriate word processing software be downloaded and moved into the secure partition 26, in addition to the key manager 28 software. One example of validation of the downloaded software will be described later.

In an operation 56 of FIG. 3, the Process C is initiated, which will now be described. Referring to FIGS. 1 and 4, in an operation 60 of FIG. 4, the software server 14 receives the request to download software, including at least the key manager 28 software, to the client 12. In an operation 62 of FIG. 4, the software server 14 authenticates the client 12. For example, in some embodiments, the request from the PEP module 22 may include a digital signature of the client 12. If authenticated, the Process C proceeds to an operation 64 of FIG. 4 and, if not authenticated, then the Process C is terminated at an operation 66 of FIG. 4. In the operation 64, the client 12 may further be checked against a list of approved authorized users, and if authorized on the list, then the Process C proceeds to the operation 68; if not on the list, the Process C is terminated at the operation 66.

In the operation 68 of FIG. 4, the software server 14 may send in a secure session to the PEP module 22 instructions for the software download and for the instantiation of the secure partition 26 of the client 12. As mentioned in the earlier example, the client 12 may have stored word processing documents to decrypt; hence, a protected version of the word processing software may be downloaded. In this example, the software server 14 may send to the PEP module 22 instructions describing the storage locations in the server 14 of the key manager 28 software and the word processing software. In some embodiments, the software server 14 also may send instructions as to how big to make the secure partition 26, based upon the executables that have to download. In other words, downloading multiple executables may lead to substantiating a larger secure partition 26.

Referring back to FIGS. 1 and 3, the remainder of the Process B of FIG. 3 now will be described. In an operation 70 of FIG. 3, the previously-described instructions for the software download and partition instantiation are received by the PEP module 22 from the software server 14. In response to the instructions, the PEP module 22 in an operation 72 instantiates the secure partition 26 in the memory resources of the client 12. In some embodiment, a hypervisor module 25 in the client 12 is executed to accomplish the formation of the secure partition, as will be described hereinafter in the description of FIG. 5.

Next, in an operation 74, the known good software, which includes at least key manager software 28 may be downloaded from the software server 14 and installed in the secure partition 26. In some embodiments, prior to downloading a hash operation may be performed by the software server 14 on the downloaded software to generate a hash value. At the PEP module 22, a hash value comparison may be undertaken to validate the downloaded software is what it is suppose to be and that, for example, there is no back door or malicious software built into it. In general, the software on the software server 14, which provides a secure depository, may be validated and certified that it is known to the protected version, and not software that has been high jacked, modified, or replaced.

With respect to the two branches 50 and 52 of Process B in FIG. 3 for processing non-encryption and encryption certificates, respectively, they now differ, with the branch 58 including an addition operation 76 for encryption certificates, which will be referred to as "current" encryption certificates in that they are currently installed in the certificate store 24. As previously described, the current private and current public key associated with a current certificate are part of the same current key pair; hence, they correspond to each other (mathematically related) and are associated with the same current certificate even though the certificate contains only the current public key. Either the current public key or the current private key may be the encrypting key, making the other key of the pair become the decrypting key, as will be described in the two examples below.

In the operation 76, as one possibility, the key manager 28 may identify data and files (encrypted information or ciphertext) previously encrypted using a current public key (encrypting key) of the expiring or expired current encryption certificate. For example, the current public key previously may have been distributed to other entities and those entities may have sent to the client 12 encrypted information using this current (old) public key. This encrypted information may be stored on the client 12, such as in an insecure location, since the information encrypted. With this possibility, the client 12 may use its current private key (decrypting key) to decrypt these files stored on the client 12, as will be discussed hereinafter.

In the operation 76, as another possibility, the key manager 28 may identify or locate encrypted information previously encrypted with the client's current private key (encrypting key) which corresponds to the current public key of the expiring or expired current encryption certificate. For an example of this possibility, the client 12 may have encrypted the encrypted information using its current private key. In this possibility, the client 12 may use its public key (decrypting key) to decrypt the encrypted information. In general, files and data on the client 12 may have been encrypted with either the current private key or current public key or some of the files and data may have been encrypted with the current public key and some may have been encrypted with the current private key.

Upon the encrypted information being identified, in the operation 76 the key manager 28 moves the encrypted information into the secure partition 26. In some embodiments, prior to moving the encrypted information to the secure partition, it may have been stored in a non-secure location, such as a mass storage device (see FIG. 5), since it is protected by encryption. For decryption, the key manager 28 may the access the appropriate current private key or current private key. When using the private key as the decrypting key, as previously described, the client may access a protected storage area in the client 12 to obtain the private key or the client 12 may prompt a user to provide the current private key via a smartcard. When using the public key as the decrypting key, the client may obtain the current public key from the certificate or from storage elsewhere in the client 12.

Thereafter, in the operation 76, the key manager 28 may perform the decrypting cryptographic operation using the current (old) key to decrypt the encrypted information in the secure partition 26, so as to obtain the unencrypted information (plaintext) from this encrypted information. In summary, if the certificate type is an encryption certificate, the key manager 28 gathers the files and data (encrypted information) from the client 12 that were encrypted with the current (old) key associated with the current (old) certificate which is expiring or has expired, and decrypts the encrypted information in the secure partition 26.

With respect to both branches 50 and 52, in an operation 78 the key manager 28 software next requests a new certificate. In some embodiments, this new certificate request may be for the same type certificate (encryption or non-encryption) as the type of the current certificate. In some embodiments, this request may be made to the PKI server 16. The PKI server 16 and the link between the client 12 and the PKI server 16 may take many different forms. In some embodiments, the PKI server 16 may be a CA and the PEP module 22 may send its request to a register manager (register authority) which is part of or separate from the CA. For example, a number of vendors provide web based PKI infrastructure, wherein the client 12 may communicate with a web-based, registration manager to make a request for a new certificate.

In some embodiments, a new key pair may be generated prior to operation 76, so that the new certificate request to the PKI server 16 may include the new public key. In some embodiments, a new key pair may be generated in the client 12 using, for example, key-generating routines of the key manager 28. In some embodiments, the new key pair may be generated by a smart card. In other embodiments, the new key pair may be generated at the PKI server 16 or a central system associated with the PKI server 16 instead of at the client 12. The new certificate may be generated at the PKI server 16 after appropriate authentication of the client 12 and may require secure distribution of the private key to the client 12.

In an operation 80, after a new certificate is requested, the key manager 28 may receive the new certificate, install the new certificate in the certificate store 24 and configure the certificate store 24. In configuring the certificate store 24, the key manager 28 may make the new certificate the default certificate, since there may be multiple certificates in the certificate store 24. For example, shortly before the expiration of a certificate (e.g. 2 weeks), the PEP module 22 may have obtained a new certificate—so there may be two valid certificates in the certificate store 24 and the new certificate may be set as the default. The old certificate (previously referred to as the current certificate) does not need to be deleted, since it automatically expires. Regardless of whether the certificate is an encryption or non-encryption certificate, the key manager 28 may request the new certificate and may install it in the local certificate store. However, after operation 80, the operations of the two branches 50 and 52 again diverge.

In the branch 52 (but not the branch 50), the data decrypted in operation 76 of FIG. 3 may be re-encrypt by the key manager 28 in an operation 82 using one of the new keys (encryption key) of the new key pair associated with the newly installed certificate. In an operation 84, the key manager 28 then may transfer the newly encrypted data back to a primary partition of the client 12 so that it is controlled by a primary operating system (see FIG. 5). In both of the branches 50 and 52, in an operation 86, the key manager 28 may remove the secure partition 26 once the previously-mentioned actions have been completed. Thereafter, the process B and may proceed to an end 88.

As a result of the security management system 10, according to some embodiments of the present invention, some protection may be provided against masquerade attacks or attacks that could compromise the integrity or availability of data. Also, key management lifecycle may be reduced by reducing the amount of keys that need to be kept on any given system. Also, the need to keep additional keys and make content highly available may be reduced without regards to the key that was used to encrypt. Also, data loss due to expired keys may be reduced. Also, employee impact by automating key renewal may be reduced. Data may be protected by encryption and decryption in the secure partition 26.

Figure 5:
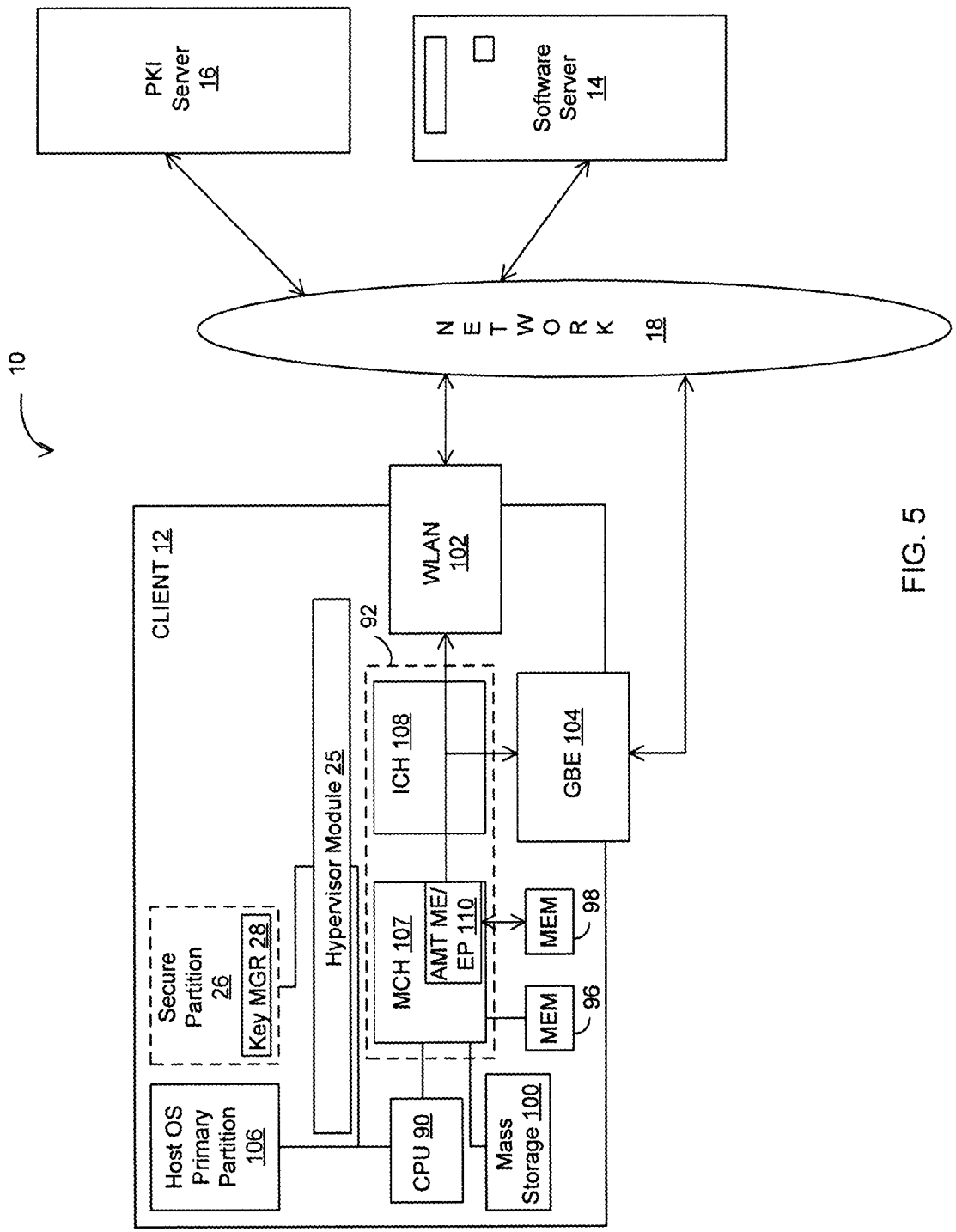
FIG. 5 is a block diagram of an illustrative example of the security management system of FIG. 1, according to some embodiments of the present invention.

With reference to FIG. 5, the security management system 10 of FIG. 1 is shown in more detail, with some of the generalized components of FIG. 1 being shown with illustrative processor, software and memory/storage components in FIG. 5. However, other components may be used to implement the security managements system 10 and the components shown in FIG. 5 are merely examples for one embodiment. In some embodiments, the client 12 may use, for example, a transport protocol such as SSL (Secure Socket Layer) to establish a secure session with the servers 14 and 16. Although any public key algorithms may be used in the system 10, in some embodiments, the RSA (Rivest, Shamir, and Adleman) encryption algorithm may be used.

In some embodiments, the client 12 may include a processor/CPU 90; a hub or core chipset 92 coupled to the processor 90; the hypervisor module 25 coupled to the processor 90; one or more system memories (illustrated by memories 96 and 98) coupled to the chipset 92; and a non-volatile mass storage 100 coupled to the chipset 92. In some embodiments, the client 12 may contain one or more network interface cards coupled to the chipset 92, as illustrated by a WLAN (Wireless Local Area Network) card 102 and a GBE (Gigabit Ethernet) card 104. As previously mentioned, the network 18 may be wired or wireless or both. These devices 96, 98, 100, 102, and 104 may be coupled to chipset 92 over a bus or busses, such as a system bus, peripheral component interface (PCI) bus, etc. Network interface cards 102 and 104 may be in communication with the network 18. In some embodiments, the client 12 may also contain additional components, such as other input-output devices (e.g., keyboard, mouse, display screen, printer, etc. or any combination of thereof), one or more co-processors, modem, etc.

In some embodiments, the client 12 may have a host OS (Operating System) primary partition 106 and the secure partition 26. These are logical components that may be formed in the system memory, such as the memory 98. The hypervisor module 25 is a supervisory program in the form of an operating system, which also may execute from system memory, such as the memory 98. The hypervisor module 25 may establish multiple logic partitions and schedule and allocate resources for the secure partition 26. More specifically, the hypervisor module 25 may schedule or allocate the physical hardware components (e.g., processor 90 and system memory 98) to operate with the logical partitions 106 and 26. In some embodiments, the system memory 98 may contain the secure partition 26 which may be a section of physical memory or virtual memory that is only accessed by code residing in the secure partition 26. As previously described, the downloaded key manager 28 software may be placed in the secure partition 26. The functions of this software have already been described and will not be repeated here.

Chipset 92 may be one or more integrated circuit chips that act as a hub or core for data transfer between the processor 90 and other components of the client 12. In some embodiments, the chipset 92 may include: (1) a MCH (Memory Control Hub) 107, which may perform multiple functionalities such as an isolated execution mode, host-to-peripheral bus interface, and memory control of the memories 96 and 98 and mass storage 100 and (2) an ICH (Input/output Controller Hub) 108, which may control, for example, the input-output devices (e.g., cards 102 and 104).

In some embodiments, the MCH 107 may include AMT (Active Management Technology Management) ME/EP (Management Engine/Embedded Processor) 110, manufactured by Intel Corp. of Santa Clara, Calif. In some embodiments, the processor 110 may have the memory 98 as its dedicated memory. The AMT functionality may function as the PDP module 20 and/or the PEP module 20 of FIG. 1. More generally, the AMT functionality may allow for the client 12 to be remotely set up, receive download software updates, perform asset inventories and find and fix many problems, even though the client 12 is turned off, the operating system has locked up or the hard drive has failed. This may be accomplished by the AMT functionality being implemented as a subsystem, completely separate from the host operating system. The AMT functionality may connect with compatible management and security software, and utilize embedded monitoring and control capabilities in the client 12. The processor 110 may be used to execute the hypervisor module 25, the PDP module 20, the PEP module 22, and the downloaded Key manager 28 software of FIG. 1. In other embodiments, there may be a single processor and a single memory for the client 12.

The processor 90 may be a general purpose processor, such as a PENTIUM class processor manufactured by Intel Corp. of Santa Clara, Calif. In another embodiment, the processor can be an Application Specific Integrated Circuit (ASIC), controller, micro-controller, etc. The system memories 96 and 98 may include any device adapted to contain digital information, with examples including, but are not limited to, a dynamic random access memory (DRAM), a static random access memory (SRAM), etc. or any combination thereof and so forth. Examples of the non-volatile mass storage 100 may include, but are not limited to, a hard disk drive, compact disk drive (CD), digital versatile disk driver (DVD), floppy diskette, tape system and so forth. In some embodiments, the processor 90, chipset 92, system memories 96 and 98, mass storage device 100 may be mounted on a system motherboard in the client 12. The network interface cards 102 and 104 may contain logic to communicate using a standard network protocol.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method, comprising:
    determining, by a client device, that a current certificate associated with the client device or a user of the client device is about to expire or has expired, with the current certificate being stored in the client device and further associated with a key pair including a current public key and a current private key;
    instantiating, by the client device, a secure memory partition in a memory of the client device in response to said determining;
    downloading, by the client device, a key manager from a software server via a network communicatively coupling the client device and the software server;
    installing, by the client device, the key manager into the secure memory partition;
    identifying, by the key manager, encrypted information stored in a storage location of the client device, the encrypted information being encrypted with the current public key of the key pair associated with the current certificate that is about to expire or has expired;
    transferring, by the key manager, the identified encrypted information from the storage to the secure memory partition;
    decrypting the encrypted information in the secure memory partition, by the key manager, using the current private key of the key pair to obtain unencrypted information;
    re-encrypting, by the key manager, the unencrypted information in the secure memory partition using a new key;
    transferring, by the key manager, the re-encrypted information from the secure memory partition to the storage location of the client device; and
    removing, by the client device, the secure memory partition in response to said transferring of the re-encrypted information.

2. The method according to claim 1, further comprising:
    requesting by the key manager of the client device, a new certificate associated with the new key;
    downloading to the client device, by the client device, the new certificate; and installing in the client device, by the key manager of the client device, the new certificate.

3. The method according to claim 2, wherein
said requesting the new certificate includes requesting the new certificate from a public key infrastructure (PKI) server;
said downloading the new certificate includes downloading the new certificate from the PKI server; and
said installing the new certificate includes installing the new certificate in a certificate store of the client device.

4. The method according to claim 1, further comprising:
after determining that the current certificate is about to expire or has expired, determining, by the client device, whether the current certificate is an encryption certificate.

5. The method according to claim 1, wherein said storage location is a non-secure storage location of the client device.

6. The method according to claim 1, wherein said determining that the current certificate is about to expire includes determining, by the client device, whether the current public key is about to expire within a predetermined period.

7. The method according to claim 6, wherein said determining that the current certificate is about to expire or has expired includes monitoring, by the client device, a certificate store including the current certificate to determine whether a stored certificate in the certificate store has expired or is about to expire.

8. An apparatus, comprising:
a certificate store to store a current certificate associated with a key pair including a current public key and a current private key;
a policy decision point (PDP) module coupled to the certificate store and configured to monitor the certificate store and to determine whether the current certificate has expired or is expiring; and
a policy enforcement point (PEP) module coupled to the PDP module and configured to instantiate a secure memory partition in a memory of the apparatus, to download a key manager from a software server over a network communicatively coupling the apparatus with the software server, and to install
the key manager in the secure memory partition, in response to a determination by the PDP module that the current certificate has expired or is expiring, wherein the key manager is configured to:
identify encrypted information stored in a storage location of the apparatus and previously encrypted with the current public key of the key pair;
transfer the identified encrypted information to the secure memory partition from the storage location;
decrypt the encrypted information in the secure memory partition with the current private key of the key pair to obtain unencrypted information;
re-encrypt the unencrypted information in the secure memory partition using a new encryption key;
transfer the re-encrypted information from the secure memory partition to the storage location of the apparatus; and
remove the secure memory partition in response to said transfer of the re-encrypted information.

9. The apparatus according to claim 8,
wherein the PEP module is further configured to download and install the key manager in response to the PDP module determining that the current certificate has expired or is expiring.

10. The apparatus according to claim 9, wherein the key manager is further configured to download to the apparatus of a new certificate associated with the new encrypting key and to install the new certificate in the certificate store upon the apparatus receiving the new certificate.

11. The apparatus according to claim 9, wherein the PDP module is further configured to determine whether the current certificate is an encryption certificate; and the key manager is further configured to identify and locate the encrypted information in the apparatus and to decrypt the encrypted information, based at least in part on the PDP module determining that the current certificate is an encryption certificate.

12. A system, comprising:
a processor;
a certificate store configured to store a current certificate associated with a key pair including a current public key and a current private key;
a policy decision point (PDP) module, in communication with the certificate store, configured to monitor and determine if the current certificate has expired or is expiring;
a policy enforcement point (PEP) module, in communication with the PDP module, configured to instantiate a secure memory partition in a memory of the system, download and install a key manager from a software server in a secure memory partition in response to the PDP module determining that the current certificate has expired or is expiring; and
wherein the key manager is configured to identify encrypted information stored in a storage location of the system and previously encrypted with the current public key of the key pair, to transfer identified encrypted information to the secure memory partition from the storage location, to decrypt the encrypted information in the secure memory partition with the current private key of the key pair to obtain unencrypted information, to re-encrypt the unencrypted information in the secure memory partition with a new key, to transfer the re-encrypted information from the secure memory partition to the storage location, and to remove the secure memory partition in response to said transfer of the re-encrypted information.

13. The system according to claim 12, wherein
the PEP module is configured to request the software server to provide the key manager.

14. The system according to claim 12, wherein
the key manager is further configured to be in communication with a public key infrastructure (PKI) server, to request from the PKI server a new certificate associated with the new key.

15. An article of manufacture comprising:
a non-transitory tangible machine-accessible storage medium; and
a plurality of instructions stored in the storage medium, configured to enable a machine, in response to execution of the instructions by the machine, to perform operations comprising:
determining, by a policy decision point (PDP) module of the machine, that a current certificate associated with the machine or a user of the machine is about to expire or has expired, with the current certificate being stored in the machine and being associated with a key pair of a current public key and a current private key;
instantiating, by a policy enforcement point (PEP) module of the machine, a secure memory partition in a memory of the machine in response to said determining;

downloading, by the PEP module, a key manager from a software server over a network communicatively coupling the machine with the software server;

installing, by the PEP module, the key manager in the secure memory partition;

identifying, by the key manager module, encrypted information stored in a storage location of the machine, the encrypted information being encrypted with the current public key of the key pair;

transferring, by the key manager module, the identified encrypted information to the secure memory partition from the storage location;

decrypting the identified encrypted information in the secure memory partition, by the key manager module, using the current private key of the key pair to obtain unencrypted information;

re-encrypting the unencrypted information in the secure memory partition, by the key manager module, using a new key; and transferring the re-encrypted information, by the key manager module, to the storage location; and removing, by the PEP module, the secure memory partition in response to said transferring of the re-encrypted information.

16. The article of manufacture of claim 15, wherein the operations further comprise:

requesting, by the key manager module, a new certificate associated with the new key; and installing, by the key manager module, the requested new certificate in the machine.

* * * * *